US007628106B2

(12) United States Patent
Pack et al.

(10) Patent No.: US 7,628,106 B2
(45) Date of Patent: Dec. 8, 2009

(54) APPARATUS AND METHOD FOR MAKING FILLED-DOUGH PRODUCTS

(75) Inventors: Bill Pack, Walla Walla, WA (US); Steve Howard, Pocatello, ID (US)

(73) Assignee: ConAgra Foods Lamb Weston, Inc., Kennewick, WA (US)

( * ) Notice: Subject to any disclaimer, the term of this patent is extended or adjusted under 35 U.S.C. 154(b) by 834 days.

(21) Appl. No.: 10/927,832

(22) Filed: Aug. 27, 2004

(65) Prior Publication Data

US 2006/0045945 A1    Mar. 2, 2006

(51) Int. Cl.
*B65G 15/58* (2006.01)
*B65G 15/04* (2006.01)
*B65G 47/74* (2006.01)
*B65G 47/82* (2006.01)
*A21C 9/04* (2006.01)
*A21C 9/06* (2006.01)

(52) U.S. Cl. ............... 99/450.7; 99/450.6; 99/450.1; 198/635; 198/803.14; 198/836.1

(58) Field of Classification Search ................ None
See application file for complete search history.

(56) References Cited

U.S. PATENT DOCUMENTS

| 1,622,709 | A | * | 3/1927 | Harry et. al. ............... 53/147 |
| 2,352,632 | A | * | 7/1944 | Heyman .................... 294/88 |
| 2,462,276 | A | * | 2/1949 | Mueller .................... 198/483.1 |
| 2,494,236 | A | * | 1/1950 | Goldstein ................. 198/482.1 |
| 3,283,471 | A | * | 11/1966 | Thurston et. al. .......... 53/157 |
| 3,323,273 | A | * | 6/1967 | Lee et al. .................. 53/436 |
| 3,456,424 | A | * | 7/1969 | Thurston et. al. .......... 53/154 |
| 3,766,702 | A | * | 10/1973 | Meissner et al. ........... 53/453 |
| 3,964,237 | A | * | 6/1976 | Johansen ................... 53/141 |
| 4,402,173 | A | * | 9/1983 | Thierion ................... 53/538 |
| 4,501,350 | A | | 2/1985 | Muller et al. |
| 4,722,432 | A | * | 2/1988 | Staton .................... 198/471.1 |
| 5,012,726 | A | * | 5/1991 | Fehr et al. ................. 99/450.6 |
| 5,085,138 | A | * | 2/1992 | Fehr et al. ................. 99/450.6 |
| 5,211,278 | A | | 5/1993 | Mendenhall |
| 5,339,948 | A | * | 8/1994 | Cox et al. ................ 198/803.15 |
| 5,528,983 | A | * | 6/1996 | Carter ..................... 99/450.4 |
| 5,601,862 | A | | 2/1997 | Askman et al. |
| 5,865,107 | A | * | 2/1999 | Sanguinetti et al. ........ 99/450.6 |

(Continued)

FOREIGN PATENT DOCUMENTS

EP          0057458          3/1985

(Continued)

*Primary Examiner*—Joseph M Pelham
(74) *Attorney, Agent, or Firm*—Klarquist Sparkman, LLP

(57) ABSTRACT

The present disclosure concerns embodiments of an apparatus and method for producing a filled-dough food product, such as a fruit-filled turnover (e.g., an apple turnover) or a single-serve pie, on an industrial scale. In one representative embodiment, the apparatus includes a filling-apportionment mechanism and a filling-transfer mechanism. The filling-apportionment mechanism is configured to apportion or separate a supply of filling pieces (e.g., pieces of fruit, such as apple pieces) into one or more portions of a predetermined size. The filling-transfer mechanism includes a vacuum pick-up device that is configured to pick up one or more portions of filling pieces from the filling-apportionment mechanism and deposit the portions on a sheet of dough.

20 Claims, 14 Drawing Sheets

U.S. PATENT DOCUMENTS

| | | |
|---|---|---|
| 5,939,117 A | 8/1999 | Chen et al. |
| 6,399,125 B1 | 6/2002 | Kershman et al. |
| 2003/0026873 A1* | 2/2003 | Collins et al. ................. 426/87 |
| 2003/0205034 A1* | 11/2003 | Sus et al. ..................... 53/502 |

FOREIGN PATENT DOCUMENTS

| | | | |
|---|---|---|---|
| FR | 2145894 A | * | 2/1973 |
| GB | 1395170 | | 5/1975 |
| GB | 1540995 | | 2/1979 |

* cited by examiner

APPARATUS AND METHOD FOR MAKING FILLED-DOUGH PRODUCTS

FIELD

The present disclosure relates generally to food handling and processing systems, and more particularly to a method and apparatus for making a filled dough product, such as a fruit turnover.

BACKGROUND

Fruit-filled dough products, sometimes called turnovers or single-serve pies, are a widely sold food item. The filling of such food products typically comprises small pieces of fruit suspended in a syrup or similar fluid medium.

In a known process for mass-producing fruit turnovers, a sheeting line conveyor carries a flat sheet of dough, upon which is deposited a measured amount of fruit filling. The fruit filling typically is deposited on the sheet of dough using a volumetric piston filler that is operable to dispense measured amounts of filling at spaced intervals along the dough sheet. Another dough sheet is placed over the deposits of fruit filling, the two dough sheets are crimped around the deposits and separated into individual turnovers, and any excess dough is trimmed from the turnovers. The turnovers can then be individually packaged and frozen for distribution to restaurants or other food-service facilities.

Turnovers produced by conventional means have several drawbacks. For example, the fruit filling necessarily contains relatively small fruit pieces to permit pumping and dispensing of the filling. The small fruit pieces reduce the perceived naturalness and nutritiousness of the product. Further reducing the appeal of such a filling is the fact that its fruit content normally must be cooked before processing to prevent oxidation of the fruit. By the time a consumer eats the turnover, the fruit has been heated twice, resulting in a taste that is far from fresh. As can be appreciated, turnovers made by conventional means do not look or taste like they are homemade.

Other disadvantages of mass-produced turnovers include those resulting from the high liquid content of the filling and the high mobility of the liquid. If soggy crust is to be avoided, a fluid-resistant lining typically is formed on the dough during processing. In addition to complicating the formulation and manufacture of the dough crust, such a lining is not normally found in home-cooked turnovers or pies, and hence further reduces the perceived naturalness and familiarity of the product.

Thus, it would be desirable to provide a food product that more closely resembles a homemade pie in appearance and taste than products made by conventional processes.

SUMMARY

The present disclosure concerns embodiments of an apparatus and method for producing a filled-dough food product, such as a fruit-filled turnover (e.g., an apple turnover) or a single-serve pie, on an industrial scale. The disclosed embodiments can be used to make filled-dough food products that more closely resemble the appearance and taste of a homemade pie than products that are mass-produced using conventional processes. Unlike conventional large-scale processes, the disclosed embodiments can be used to make single-serve pies with a filling that comprises fresh pieces of fruit. One characteristic of fresh fruit pieces is that they are uncooked. In certain embodiments, for example, single-serve apple pies are made with a filling comprising fresh, relatively large apple pieces, much like the filling of a homemade apple pie. Further, the fruit pieces do not have to be mixed with a syrup or other fluid medium, as in conventional large-scale processes.

In one representative embodiment, an apparatus for making a filled-dough food product includes a filling-apportionment mechanism and a filling-transfer mechanism. The filling-apportionment mechanism is configured to apportion or separate a supply of filling pieces (e.g., pieces of fruit, such as apple pieces) into one or more portions of filling pieces of a predetermined size. The filling-transfer mechanism includes a pick-up device that is fluidly connectable to a vacuum source.

The pick-up device is configured to pick up one or more portions of filling pieces from the filling-apportionment mechanism when a vacuum from the vacuum source is applied to the pick-up device and the pick-up device is positioned proximate to the portions of filling pieces to be picked up. After picking up the portions of apple pieces, the pick-up device is used to transfer them to a position above a sheet of dough, at which point the vacuum is removed from the pick-up device to cause the filling pieces to be deposited on the dough.

The filling-transfer mechanism can include a valve that is selectively operable to fluidly connect the vacuum source to the pick-up device for picking up filling pieces and to fluidly disconnect the vacuum source from the pick-up device to release filling pieces from the surface of the pick-up device. The valve can be configured to vent the pick-up device to atmosphere when the valve is actuated to fluidly disconnect the vacuum source from the pick-up device to facilitate the release of filling pieces. An optional vibrating mechanism can be mounted on the pick-up device. When activated, the vibrating mechanism causes the pick-up device to vibrate, which facilitates the release of filling pieces from the pick-up device.

The filling-transfer mechanism can include a robotic arm for moving the pick-up device from a first filling pick-up location in the filling-apportionment mechanism to a second location for depositing the filling pieces on a sheet of dough. In certain embodiments, the sheet of dough is conveyed on a dough conveyor, which can be oriented to convey the dough sheet just below the filling-apportionment mechanism. After picking up one or more portions of filling pieces, the robotic arm desirably is operated to move the pick-up device in the same direction and at the same speed as the dough sheet as the pick-up device deposits the filling pieces onto the moving dough sheet.

The filling-apportionment mechanism in particular embodiments includes a plurality of filling cups, each of which is sized and shaped to receive a portion of filling pieces. The filling cups can be formed in the surface of an endless conveyor. In use, a supply of filling pieces is conveyed or otherwise placed on the conveyor. A rotatable raking device is mounted at a location to contact the pile of filling pieces on the conveyor. As the conveyor advances beneath the rotating raking device, the raking device rakes the pile of filling pieces into the filling cups. The conveyer further moves the cups containing respective portions of filling pieces to a transfer area where they can be picked up by the pick-up device.

The pick-up device can be formed with one or more transfer cups that are sized and shaped to mate with corresponding filling cups of the filling-apportionment mechanism. When each transfer cup of the pick-up device is positioned over a respective filling cup, and a vacuum is applied to the pick-up device, the vacuum causes the filling pieces to be drawn into and held against an inner surface of each transfer cup. Each transfer cup can be formed with a downwardly extending, annular wall that is configured to form a substantially fluid-tight seal around a respective filling cup. This facilitates the formation of a vacuum in the filling cups for drawing the apple pieces upwardly into the transfer cups. Additionally, the lower surface of each filling cup can be permeable to air to allow air to be drawn upwardly into the filling cups below the apple pieces when a vacuum is applied to the pick-up device. The upward flow of air assists in lifting the apple pieces into respective transfer cups.

The foregoing and other features and advantages of the invention will become more apparent from the following detailed description of several embodiments, which proceeds with reference to the accompanying figures.

DETAILED DESCRIPTION

As used herein, the singular forms "a," "an," and "the" refer to one or more than one, unless the context clearly dictates otherwise. As used herein, the term "includes" means "comprises." As used herein, the term "vacuum" refers to any negative pressure that is less than atmospheric pressure.

The methods for making foodstuffs using the apparatus described herein may be implemented in software stored on a computer-readable medium and executed on a general-purpose computer. For clarity, only those aspects of the software germane to the invention are described; product details well-known in the art are omitted. For the same reason, the computer hardware is not described in further detail. In addition, the software can be implemented as hardware. It should thus be understood that the invention is not limited to any specific computer language, program or computer.

Referring initially to FIGS. 1-4, there is shown a system, indicated generally at 10, according to one embodiment for making filled-dough products. One exemplary use of the system 10 is for making turnovers filled with fruit, such as apple, peaches, raspberries, or strawberries, to name a few. Accordingly, by way of example, the following description proceeds with reference to making apple turnovers (also called single-serve pies). However, the system also can be used to make various other filled-dough food products, such as chicken pies, "pizza pockets," and various other food items having a dough casing or pocket containing a filling.

Figure 2:
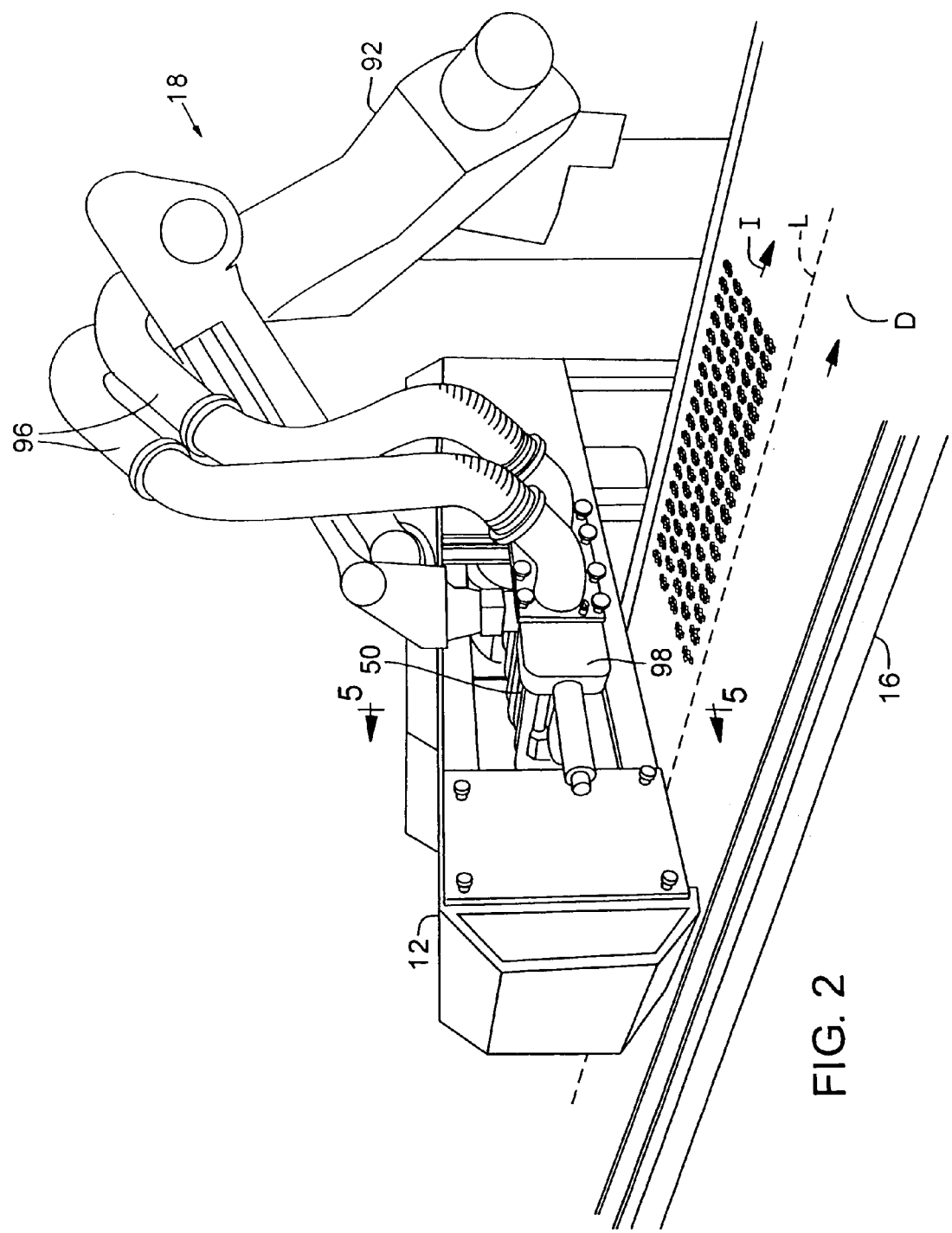
FIG. 2 is a perspective view of a filling-transfer device and a dough conveyor of the system, according to one embodiment, with the filling-transfer device being shown in position for picking up apple pieces separated into individual portions by the filling-apportionment device.
Figure 3:
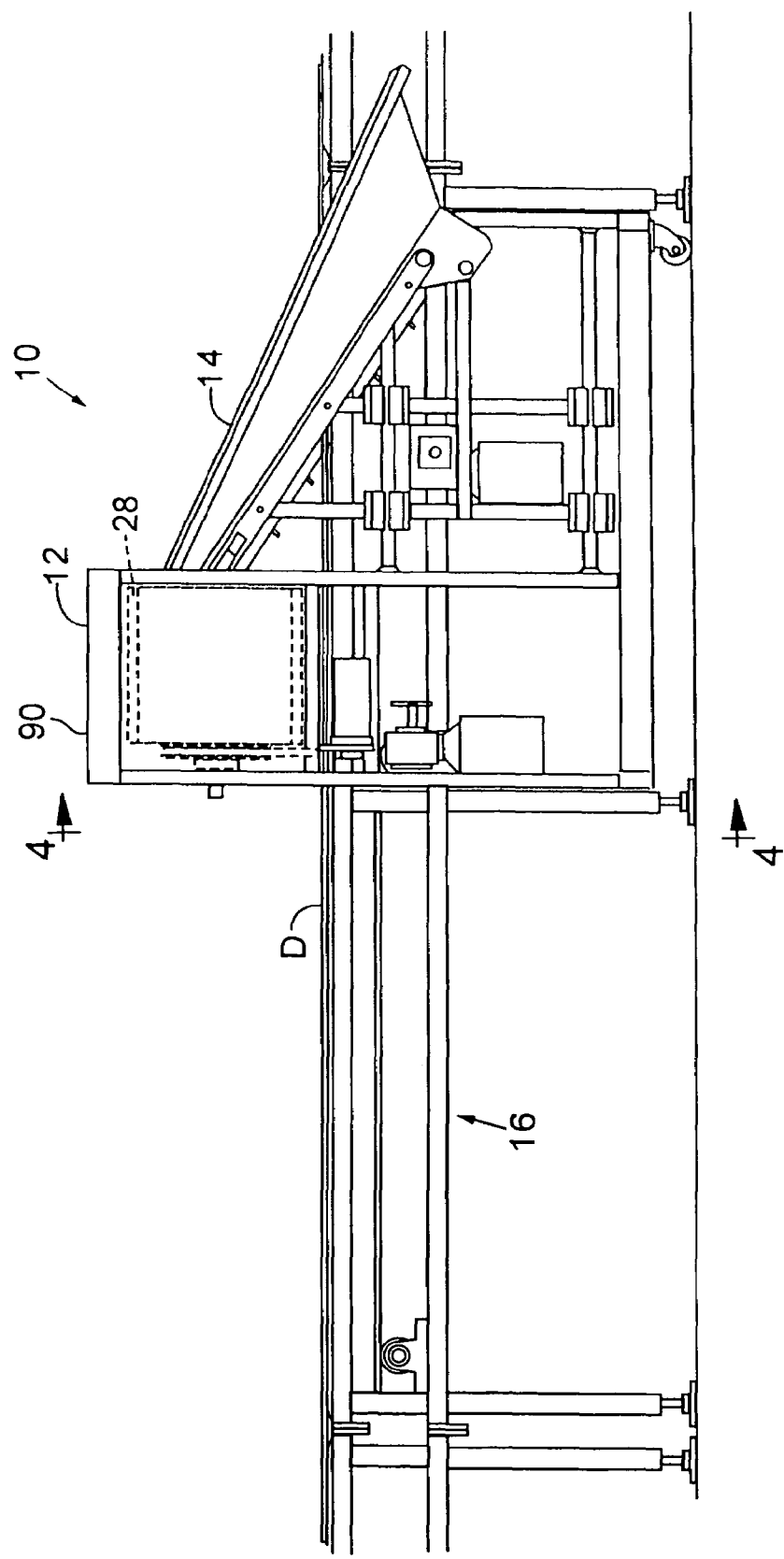
FIG. 3 is a side elevation view of the dough conveyor, the filling-apportionment device and the in-feed conveyor.

The system 10 in the illustrated embodiment generally includes a filling-apportionment device 12 (also referred to herein in other embodiments as a filling-apportionment mechanism) for apportioning a supply of apple pieces (or other types of filling pieces) into smaller, individual portions of a predetermined size, an in-feed conveyor 14 for conveying apple pieces to the filling-apportionment device, a dough conveyor 16 (FIGS. 2-4), and a filling-transfer device 18 (FIG. 2) (also referred to herein in other embodiments as a filling-transfer mechanism) for transferring portions of apple pieces from the filling-apportionment device 12 to a sheet of dough D that is conveyed on the dough conveyor 16. As shown in FIGS. 2 and 3, the dough conveyor 16 can be oriented in a generally perpendicular relationship relative to the filling-apportionment device 12, with dough conveyor 16 positioned to convey the sheet of dough D just below the filling-apportionment device 12.

The components of the system 10 can be controlled by respective controllers (not shown) that are in communication with each other. One type of controller that can be used is an Allen Bradley programmable logic controller ("PLC"). Alternatively, each component can be operatively connected to a main controller that controls the operation of the system.

In certain embodiments, fresh, uncooked apple pieces are used to make the turnovers. To form the apple pieces, apples can be peeled, cored, and cut using conventional techniques. The apples desirably are cut into relatively large pieces (e.g., approximately ½ inch ×¾ inch ×½ inch, although the size of each piece can vary) to resemble apple pieces used in homemade or fresh baked apple pies. To minimize or prevent oxidation (browning) during subsequent processing, the apple pieces desirably are coated with a suitable preservative, such as NatureSeal® (available from Mantrose-Haeuser Co., Inc., Attleboro, Mass.). The apple pieces can be coated with the preservative using conventional techniques, such as by dipping, sprinkling, tossing, immersing, or drenching. An advantage of the illustrated system is that it is adapted to protect the integrity of the preservative coating on the apple pieces, and hence prevents oxidation of the apple pieces during processing of the turnovers.

Figure 1:
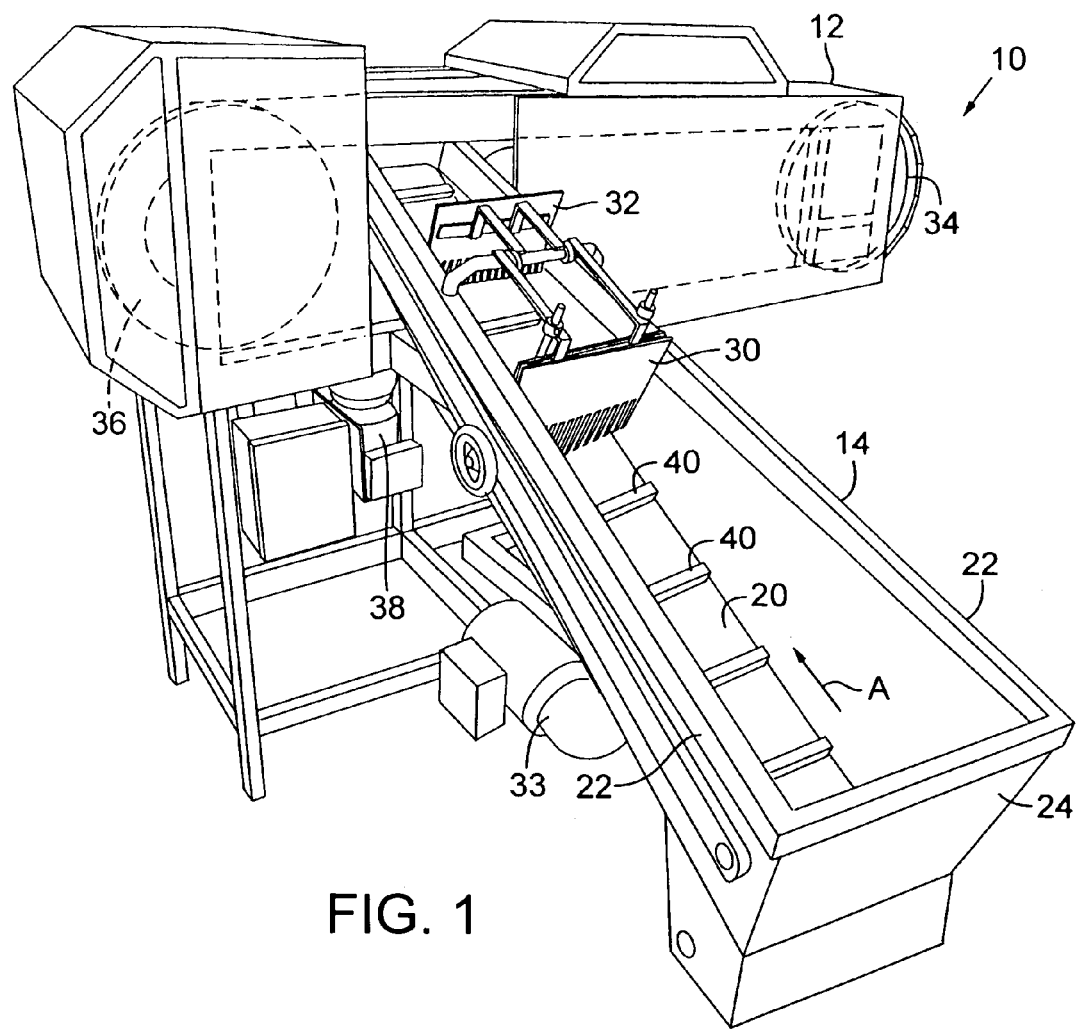
FIG. 1 is a perspective view of a filling-apportionment device and an in-feed conveyor of a system for producing a filled-dough product, according to one embodiment.
Figure 4:
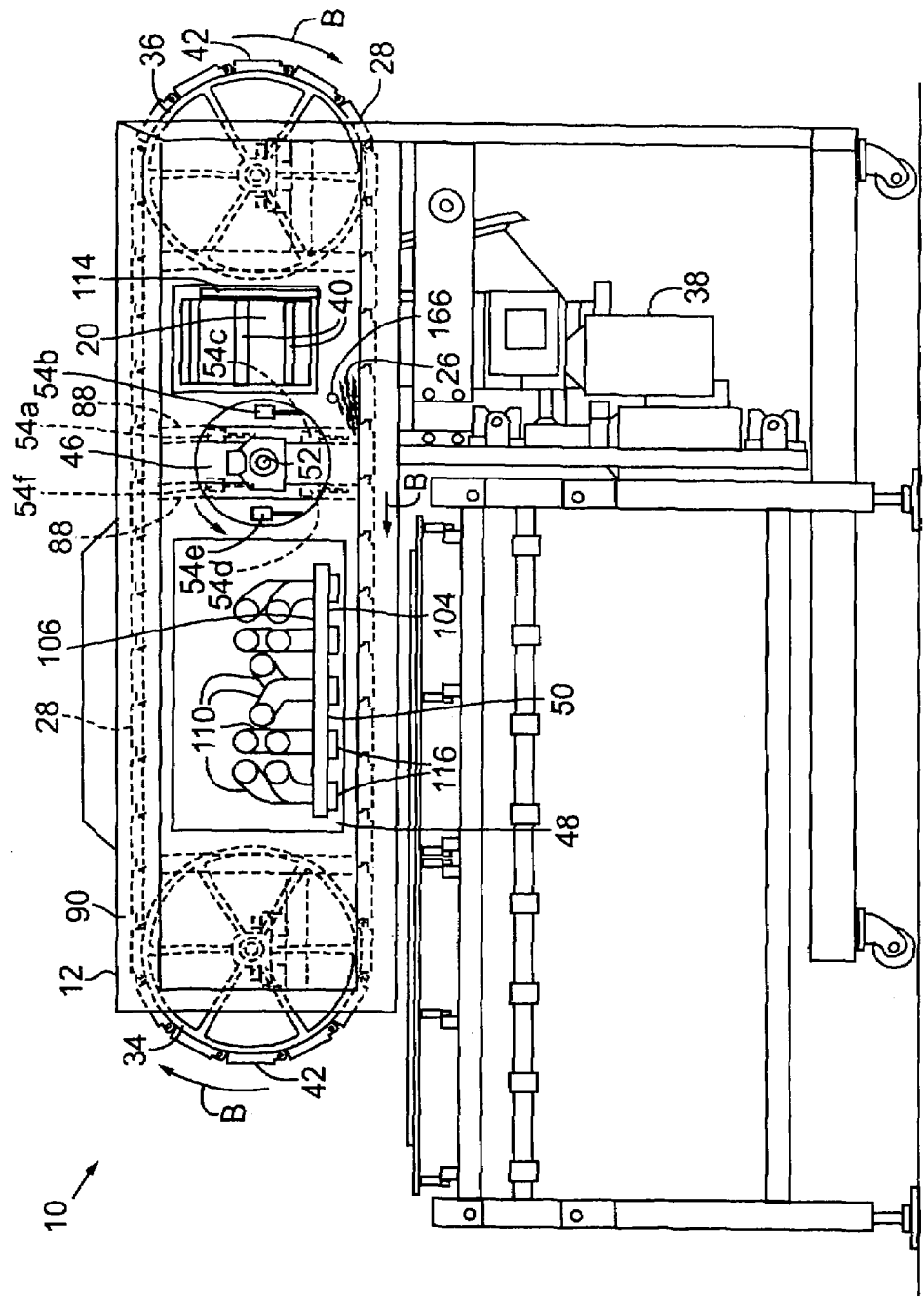
FIG. 4 is a cross-sectional view of the dough conveyor taken along line 4-4 of FIG. 3, showing the back of the filling-apportionment device and a head portion of the filling-transfer device positioned in the transfer area of the filling-apportionment device for picking up one or more portions of apple pieces.

As best shown in FIG. 1, the in-feed conveyor 14 in the illustrated embodiment includes an endless conveyor belt 20 that can be partially enclosed by vertical side walls 22 and an end wall 24. The belt 20 can be driven by an electric motor 33 or various other suitable techniques or mechanisms. The upper end portion of the conveyor 14 extends into the apportionment device 12. In use, apple pieces are deposited on the belt 20 at the lower end of the conveyor and are conveyed upwardly into the apportionment device 12 in the direction of arrow A. As shown in FIG. 4, apple pieces fall off the upper end of the in-feed conveyor and form a pile 26 on an apportionment conveyor 28 of the filling-apportionment device 12.

The in-feed conveyor 14 also may include one or more rakes or leveling devices 30, 32 (FIG. 1) supported above the conveyor belt 20. As the conveyor belt 20 moves relative to the leveling devices 30, 32, the leveling devices level the supply of the apple pieces deposited on the conveyor belt 20 into a more evenly distributed layer of apple pieces. Additionally, the conveyor belt 20 may include a plurality of partitions 40 (as best shown in FIG. 1) that are spaced along the length of the belt to assist in conveying the apple pieces in the upward direction.

A photoelectric sensor 166 (FIG. 4) can be positioned at a convenient location in the filling-apportionment device 12 to detect the height of the pile 26 of apple pieces on the apportionment conveyor 28. The photoelectric sensor 166 is electrically connected to a controller (not shown) that controls movement of the in-feed conveyor 14. If the photoelectric sensor detects that the pile has reached a predetermined height, the controller stops the in-feed conveyor 14 to prevent further apple pieces from being conveyed into the filling-apportionment device 12. The controller also can be used to increase or decrease the speed of the in-feed conveyor 14 to increase or decrease the rate at which apple pieces are conveyed into the filling-apportionment device if the photoelectric sensor detects that the pile is below or above a predetermined height.

The filling-apportionment device 12 functions to apportion the supply of apple pieces from the in-feed conveyor 14 into discrete portions of a predetermined size. As best shown in FIG. 4, the filling-apportionment device 12 in the illustrated configuration includes a generally rectangular housing 90 and first and second spaced apart wheels 34 and 36, respectively, that are mounted to the housing 90 and support the apportionment conveyor 28 for movement in the direction indicated by arrows B. One or both wheels 34, 36 can be driven by any suitable mechanisms or techniques to cause movement of the apportionment conveyor 28. In the illustrated embodiment, for example, a servomotor (not shown) is operatively connected to the wheel 36 for causing rotational movement thereof.

Figure 5:
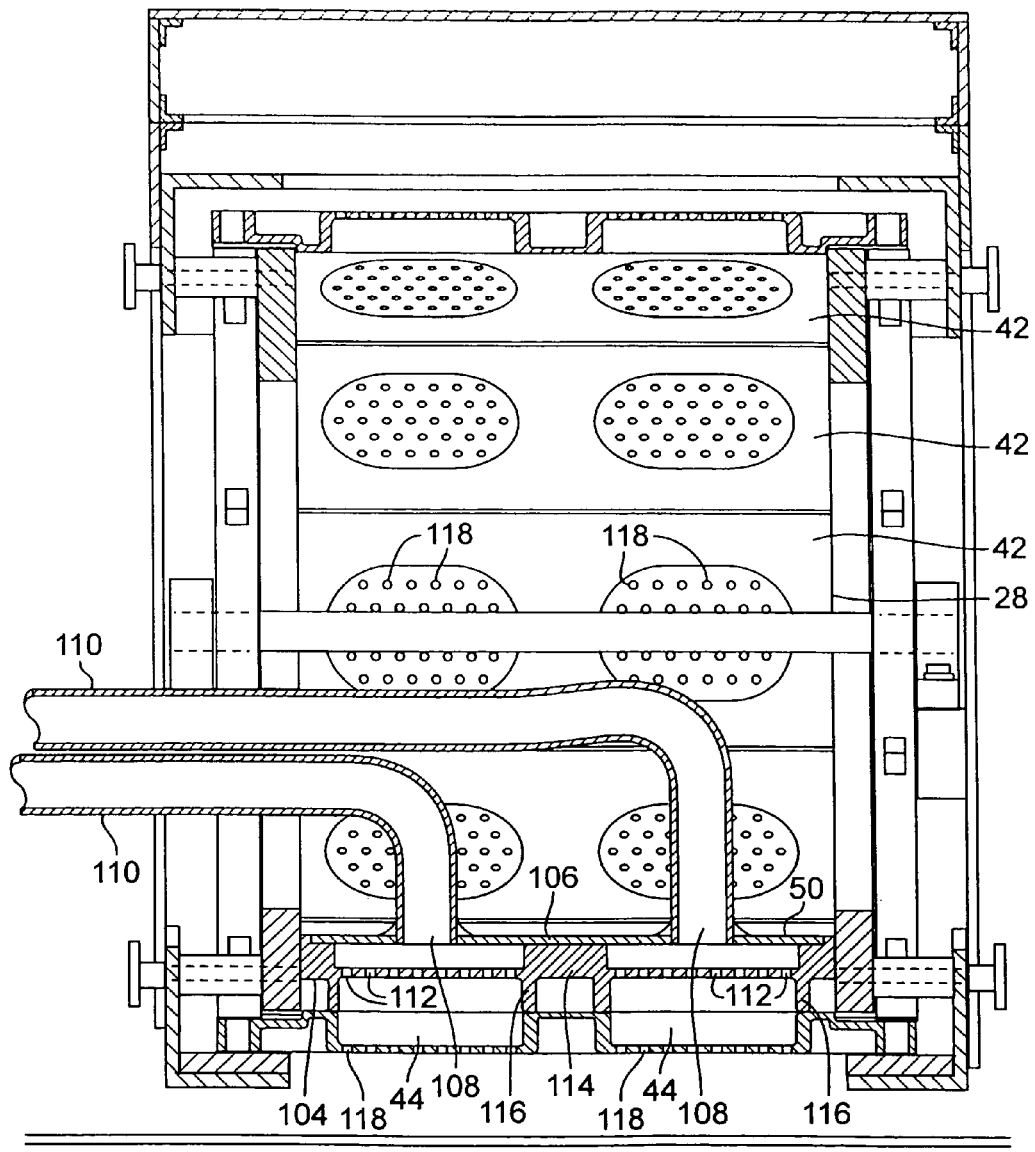
FIG. 5 is an enlarged, partial sectional view of the filling-apportionment device and the head portion, showing transfer cups of the head portion aligned over respective filling cups of the filling-apportionment device.
Figure 6:
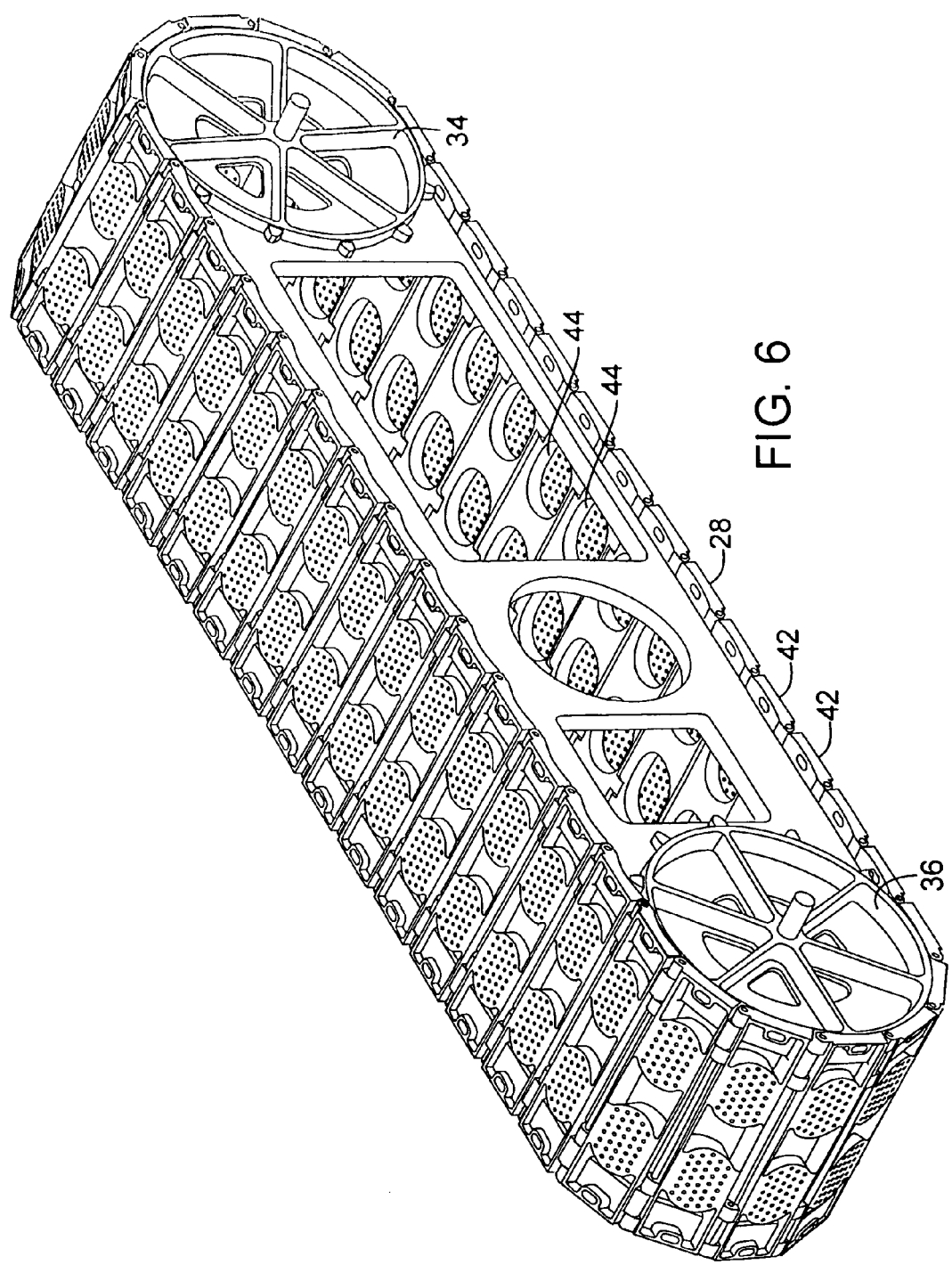
FIG. 6 is an enlarged, perspective view of the apportionment conveyor of the filling-apportionment device.

The apportionment conveyor 28 comprises an endless loop of a plurality of interconnected flights 42. Each flight 42 is formed with one or more filling cups 44 (also referred to herein in other embodiments as apportionment cups) (as best shown in FIGS. 5 and 6) that are sized to receive a portion of apple pieces. The manner in which the apple pieces are distributed into the filling cups 44 is described in detail below.

The filling cups 44 desirably have the same general shape as the final shape of the apple turnovers so that a dough casing can be formed around each portion of apple pieces after it is transferred to the dough sheet D (FIG. 2). As best shown in FIGS. 5 and 6, the filling cups 44 in the illustrated embodiment are generally oval with oblate or flat sides. However, the filling cups may have various other geometric shapes, such as square, rectangle, circle, triangle, or various combinations thereof.

In one implementation, the filling cups 44 have a length of about 4 inches, a width of about 2 inches, a depth of about 1 inch, and can be filled with about 5.4 ounces of apple pieces (although the exact amount will depend on the size of the apple pieces used). Of course, these specific dimensions (as well as other dimensions provided in the present specification) are given to illustrate the invention and not to limit it. The dimensions provided herein can be modified as needed in different applications or situations.

As further shown in FIG. 4, the filling-apportionment device 12 also may include a rotating raking device 46 (also referred to herein in other embodiments as a raking mechanism) supported inside the apportionment conveyor 28 between the wheels 34, 36. Located between the wheel 34 and the raking device 46 is a transfer area 48 that is sized to receive a head portion 50 (also referred to herein in other embodiments as a pick-up device) of the filling-transfer device 18.

Figure 7:
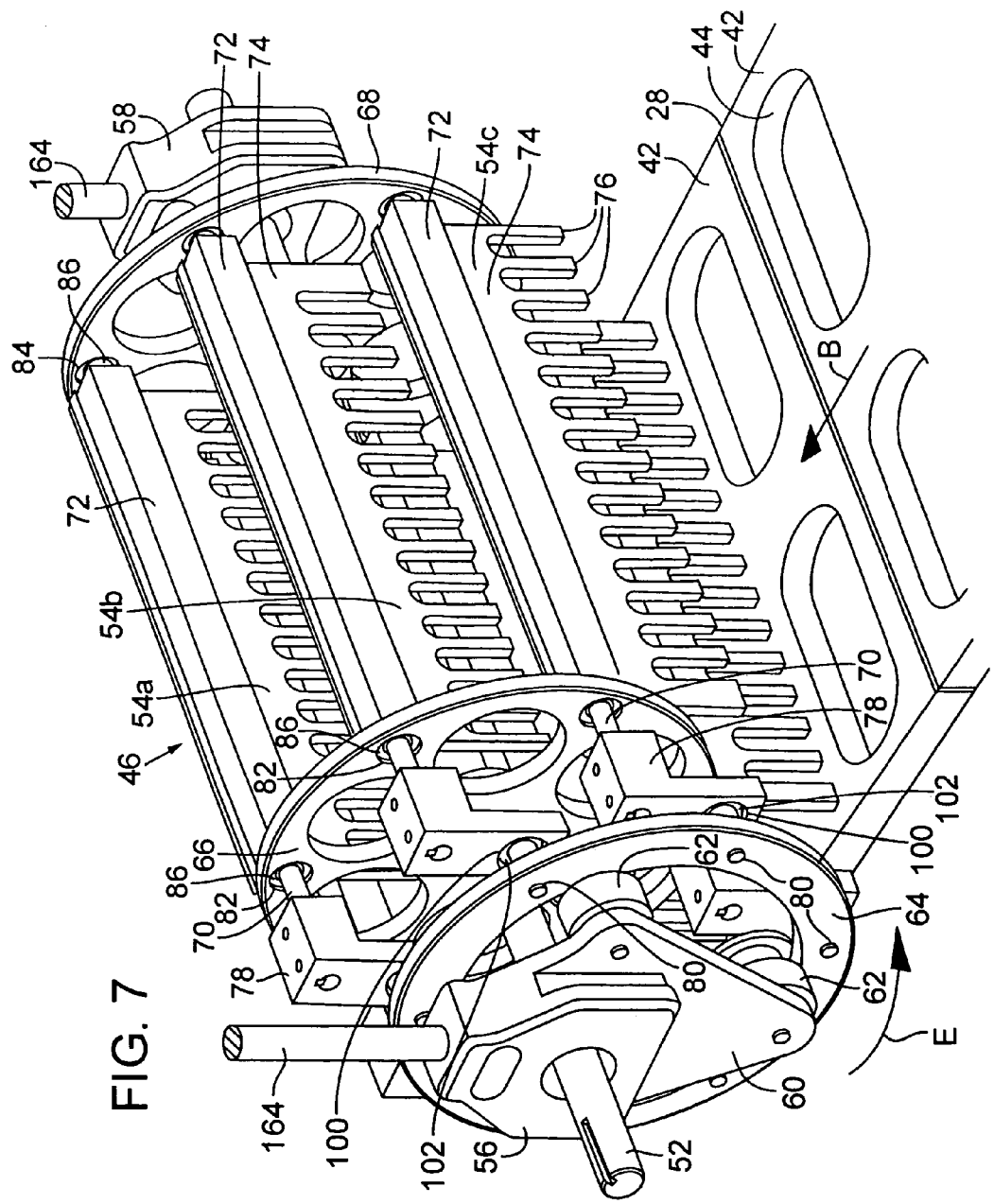
FIG. 7 is an enlarged, perspective view of the raking device of the filling-apportionment device.

The raking device 46 is supported for rotational movement in a direction opposite that of the apportionment conveyor 28, as indicated by arrow C in FIG. 4. Rotational movement of the raking device 46 can be achieved by any suitable mechanisms or techniques. In the illustrated embodiment, for example, the raking device is operatively connected to a motor 38 through a suitable drive-transmission assembly. The raking device 46 includes a plurality of angularly spaced, downwardly extending rake arms 54a, 54b, 54c, 54d, 54e, and 54f (FIG. 7). As the apportionment conveyor 28 conveys the pile 26 of apple pieces toward the raking device 46 (in the direction of arrow B), the rotating rake arms 54 rake the pile of apple pieces into the filling cups 44. The motor 38 can be connected to a variable-speed drive controller to increase or decrease the rotational speed of the raking device 46.

As best shown in FIG. 7, the shaft 52 in the illustrated configuration is supported at opposite ends by bearing assemblies 56 and 58. Each bearing assembly 56, 58 is mounted between a pair of upright supports 88 (FIG. 4) that extend between the upper and lower portions of the frame 90. The raking device 46 also can be supported by posts 164 (FIG. 7), each of which is secured at a lower end to a respective bearing assembly 56, 58 and at an upper end to the housing 90. The posts 164 can have upper end portions that are threadably received by respective nuts mounted on the housing 90. In this manner, the height of the raking device 46 above the apportionment conveyor can be adjusted by adjusting the nuts that support the upper end portions of the posts 164. As shown in FIG. 7, the raking device 46 desirably is configured to maintain the rake arms 54a-54f in a vertical position so that they remain generally perpendicular to the flights 42 of the apportionment conveyor advancing beneath the raking device.

To such ends, the bearing assembly 56 includes a plate 60 (FIG. 7) that supports a plurality of angularly spaced rollers 62, which in turn support a crank ring 64 for rotational movement relative to the rollers. A plurality of angularly spaced crank mechanisms 78 are coupled to the crank ring 64 by respective bolts 80. Each bolt 80 is secured to the crank ring 64 and extends through a corresponding aperture 100 in the lower end portion of a respective crank mechanism 78. The apertures 100 are sized to permit rotation of the bolts 80 relative to the apertures 100 upon rotation of the crank ring 64. Apertures 100 can be fitted with respective bearings 102 to facilitate rotational movement of the bolts 80 within the apertures 100. Bearings 102 can be, for example, sleeve bearings made of a low-friction material, such as Delrin® or nylon. The upper portion of each crank mechanism 78 is coupled to a respective rake arm 54a-54f by a respective crank shaft 70.

As further shown in FIG. 7, supported on opposite end portions of the shaft 52 are first and second end plates 66 68, respectively. The shaft 52 can be coupled to the motor 38 via a belt-and-pulley drive assembly (not shown) to cause rotational movement of the shaft 52 and the end plates 66, 68. The rake arms 54a-54f are coupled to the end plates 66, 68 by respective crank shafts 70, each of which extends through an upper portion 72 of a respective rake arm. The end portions of the crank shafts 70 adjacent the first end plate 66 extend through corresponding openings 82 in the first end plate and are coupled to respective crank mechanisms 78. The opposite end portions of crank shafts 70 are supported in corresponding openings 84 in the second end plate 68. Openings 82, 84 can be fitted with respective bearings 86 to facilitate rotational movement of the crank shafts 70 relative to the openings. Bearings 86 can be, for example, sleeve bearings made of a low-friction material, such as Delrin® or nylon.

Figure 8:
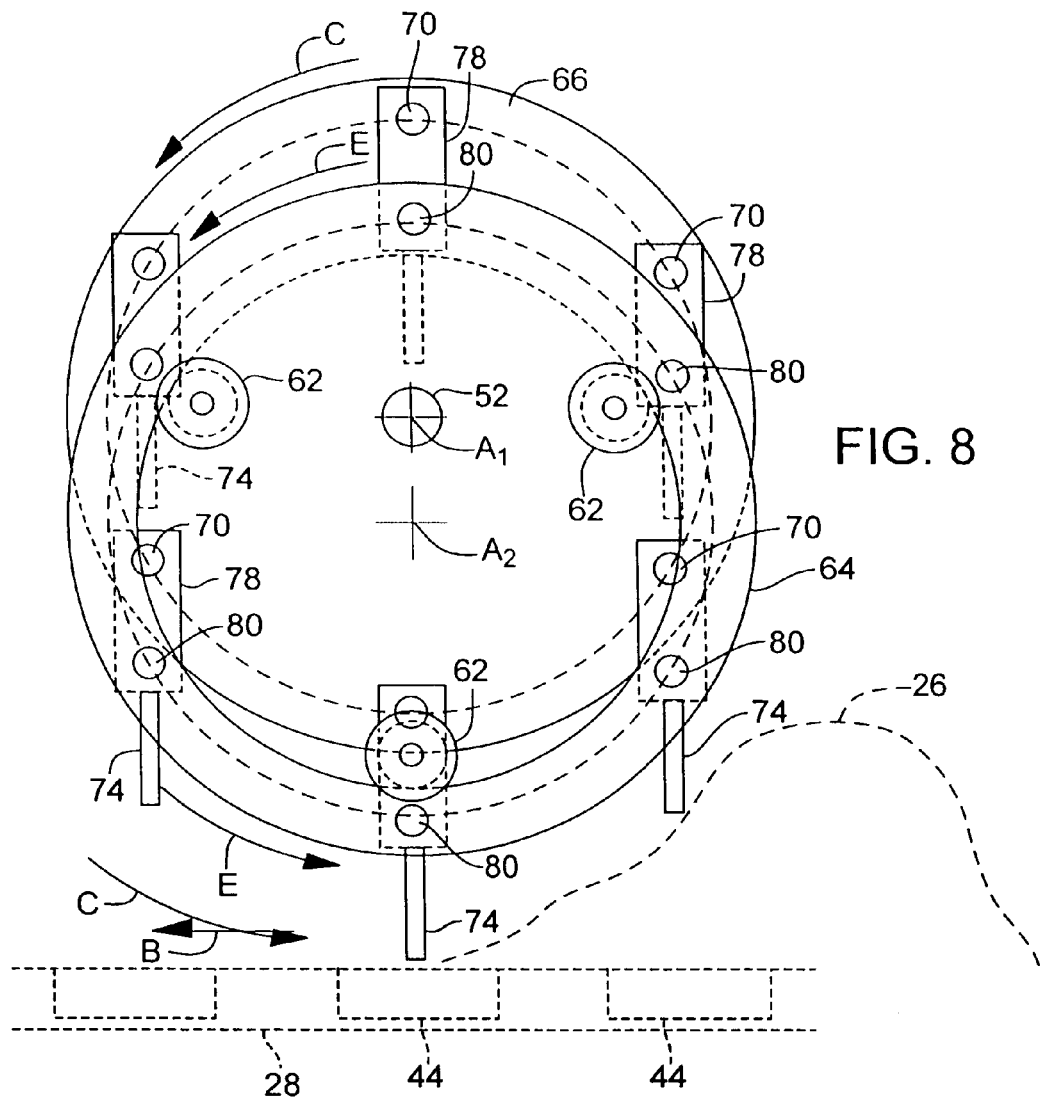
FIG. 8 is a schematic view showing the operation of the raking device.

Referring to FIG. 8, rotation of the shaft 52 causes rotation of the end plates 66, 68 about a rotation axis $A_1$ (as indicated by arrows C), and rotation of the crank ring 64 about a rotation axis $A_2$ that is offset from the rotation axis $A_1$ (as indicated by arrows E). As noted above, the crank shafts 70 can rotate within the openings 82, 84 in the end plates 66, 68, respectively, while the bolts 80 can rotate within the apertures 100 in the lower end portions of the crank mechanisms 78. Hence, as the crank ring 64 and the end plates 66, 68 are rotated about their respective axis, the rake arms 54a-54f also are rotated but are maintained in a generally perpendicular relationship relative to the adjacent surface of the apportionment conveyor. Advantageously, maintaining the rake arms in this position assists in raking the apple pieces into the filling cups 44 by maximizing contact between the lower portions 74 of the rake arms and the pile 26 of apple pieces.

As best shown in FIG. 7, the lower portion 74 of each rake arm can be formed with a plurality of longitudinally spaced tines, or projections, 76 that rake the apple pieces into the filling cups 44. The clearance or spacing between the lower ends of the tines 76 and the upper surfaces of the flights 42 desirably is selected such that apple pieces supported on the upper surface of a flight (and not in a filling cup 44) cannot pass below the tines 76. The spaces between adjacent tines 76 can be sized to permit apple pieces to pass between the tines.

To prevent apple pieces on the upper surface of a flight 42 from being conveyed past the raking device 46, each rake arm can have tines 76 that are staggered or longitudinally offset (i.e., offset in the direction extending between the end plates 66, 68) with respect to the tines 76 of an adjacent rake arm. For example, in the illustrated embodiment, the tines 76 of the rake arm 54a are aligned with the spaces between the tines 76 of the rake arm 54b in the direction of movement of the apportionment conveyor 28. Similarly, the tines 76 of the rake arm 54b are aligned with the spaces between the tines 76 of the rake arm 54c, and so on. In this manner, as the raking device 46 is rotated relative to the apportionment conveyor 28, an apple piece that is supported on the upper surface of a flight 42 and passes through the spacing between adjacent tines 76 will be conveyed into the path of a tine of a succeeding rake arm.

In an alternative embodiment, each rake arm can have a solid and continuous lower portion without any spaced-apart tines. In other embodiments, a non-rotating raking device can be provided. For example, in one implementation, a raking device can be configured to support one or more rake arms above the filling cups 44 and to move the rake arms along a generally linear path in the opposite direction of the apportionment conveyor. In another implementation, one or more stationary rake arms can be supported above the filling cups 44.

As noted above, the filling-transfer device 18 includes a head portion 50 that is sized to fit within a transfer area 48 (FIG. 4) of the filling-apportionment device 12 for picking up and transferring one or more portions of apple pieces from respective filling cups 44 to the dough sheet D on the dough conveyor 16 (FIG. 2). As shown in FIG. 2, the head portion 50 in the illustrated configuration is mounted on a robotic arm 92 that is configured to move in three-dimensional space. The robotic arm 92 is operatively connected to a controller (not shown) for controlling movement of the robotic arm 92 and the head portion 50. In one embodiment, the robotic arm 92 comprises a model 420i robotic arm available from Fanuc Robotics America, Inc. (Los Angeles, Calif.).

Other types of robotic devices also can be used to move the head portion 50 between the transfer area 48 and the dough conveyor 16. For example, the head portion 50 can be carried by one or more carriages or equivalent devices that are mounted for movement along respective tracks or rails. In addition, various other types of mechanical, electrical, hydraulic, and/or pneumatic devices can be used to achieve movement of the head portion 50 of the filling-transfer device. Although less desirable, the head portion 50 can be manually moved by an operator to transfer portions of apple pieces between the transfer area 48 and the dough sheet D.

As shown in FIG. 2, the head portion 50 is fluidly connectable to a vacuum source (not shown) via one or more vacuum conduits 96 (which can be, for example, flexible hoses). The vacuum source can be one or more dedicated vacuum pumps or a house vacuum system. The filling-transfer device 18 can include a sliding gate valve 98 mounted on the head portion 50 and connected to the vacuum conduits 96. The gate valve 98 controls the application of vacuum from the vacuum source to the head portion, as further described below.

Figure 9:
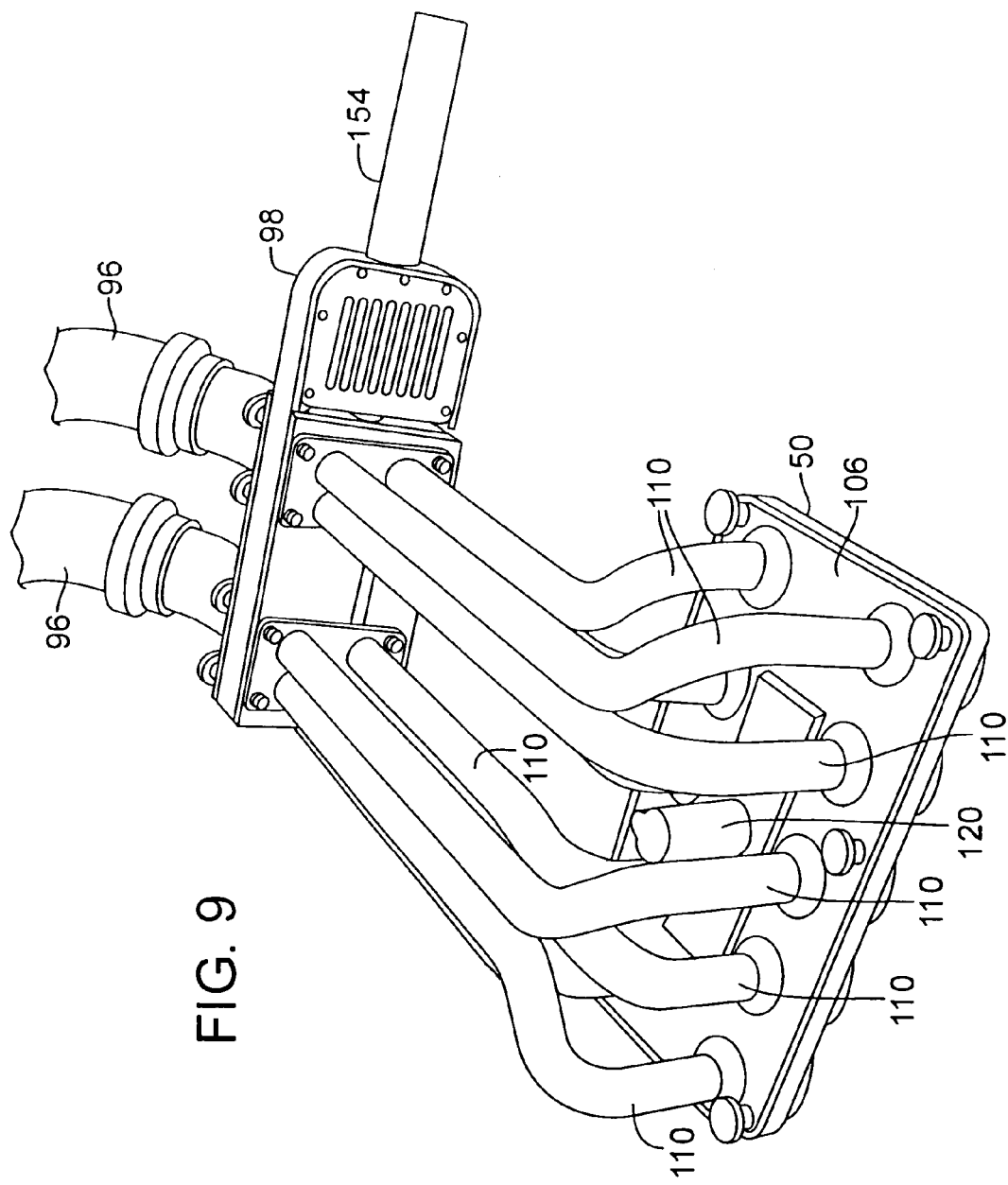
FIG. 9 is a perspective view of the head portion and a gate valve that fluidly connects the head portion to a vacuum source, as viewed from the top of the head portion.
Figure 10:
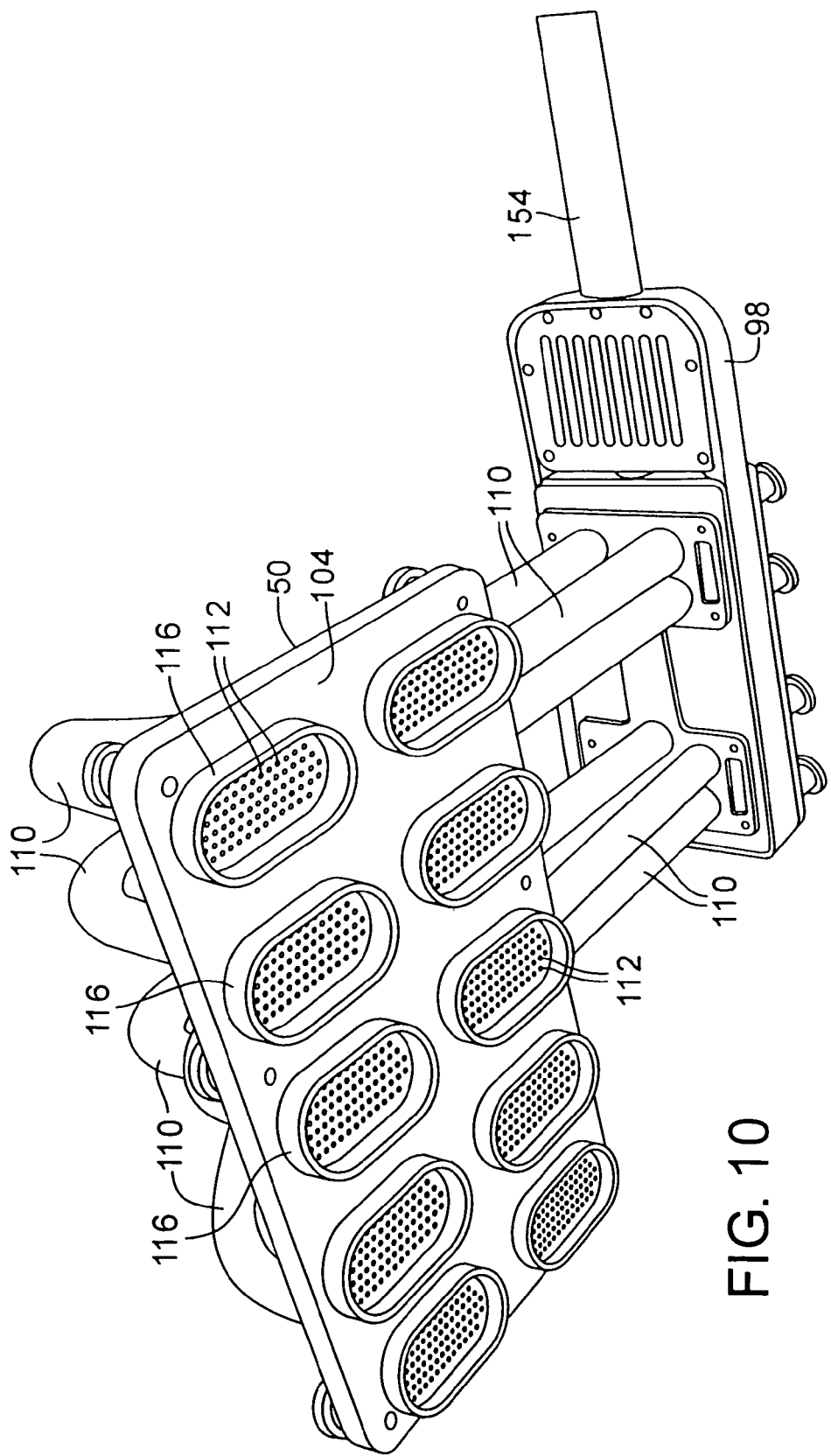
FIG. 10 is a perspective view of the head portion and the gate valve, as viewed from the bottom of the head portion.
Figure 11:
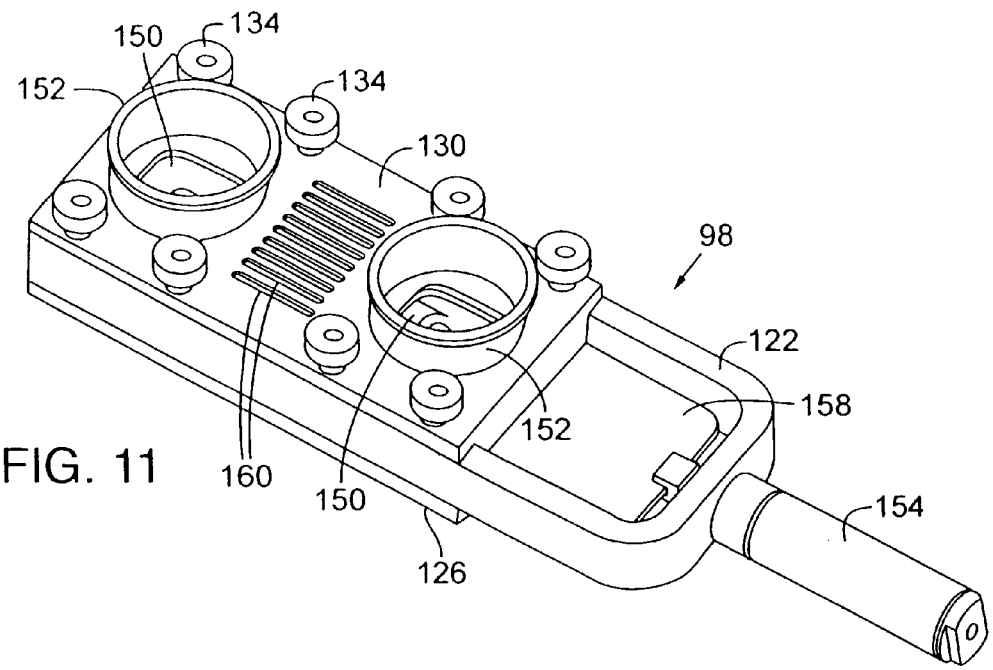
FIGS. 11 and 12 are perspective views showing opposite sides of the gate valve.
Figure 12:
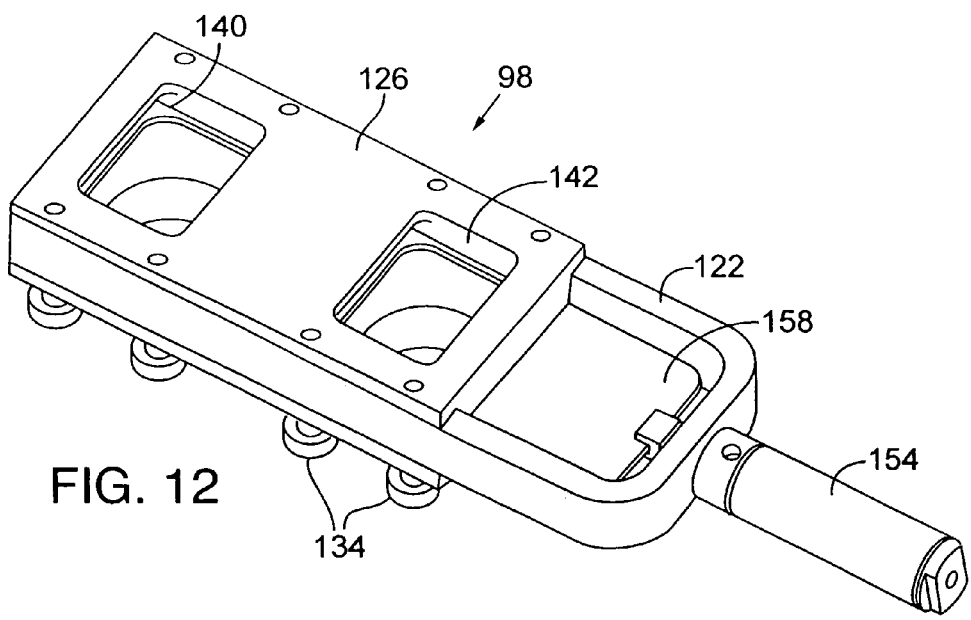

As best shown in FIGS. 9 and 10, the head portion 50 in the illustrated embodiment comprises a lower plate 104 (FIG. 10) and an upper plate 106 (FIG. 9). The upper plate 106 is formed with a plurality of openings or apertures 108 (FIG. 5), each of which is fluidly connected to one end of a respective vacuum line 110. As shown in FIGS. 9 and 10, the opposite ends of the vacuum lines 110 are fluidly connected to the gate valve 98. Thus, when the gate valve 98 is opened to fluidly connect the vacuum source to the head portion 50, vacuum is applied to each opening 108 (FIG. 5) via a respective vacuum line 110.

The lower plate 104 is permeable to air in selected locations corresponding to the shape of the fillings cups 44 in the apportionment conveyor 28 so that apple pieces can be picked up and held against the bottom surface of the lower plate 104 when a vacuum is applied to the head portion. In this manner, the bottom surface of the lower plate 104 serves as a "pick-up" surface for picking apple pieces when a vacuum is applied to the head portion.

For example, as shown in FIGS. 5 and 10, the lower plate 104 in the illustrated embodiment is formed with a set of apertures 112 located below each opening 108 in the upper plate 106. The lower plate 104 can be formed with a web of material 114 (FIG. 5) separating each opening 108 and a corresponding set of apertures 112. Each set of apertures 112 occupies an area of the lower plate 104 that generally corresponds to the footprint of a filling cup 44. Thus, when the head portion 50 is positioned in the transfer area 48 for picking up portions of apple pieces, each set of apertures 112 can be positioned over a filling cup 44, as depicted in FIG. 5. Applying a vacuum to the head portion 50 causes apple pieces in the filling cups 44 to be drawn upwardly and held against the lower plate 104. The apertures 112 are sized smaller than the apple pieces to prevent the apple pieces from passing through the apertures.

The lower plate 104 can be a unitary piece of material that is formed with apertures 112, such as shown in FIG. 5. In alternative embodiments, the lower plate can include an air-permeable material, such as a mesh screen, cloth, or cloth-like material, mounted below each opening 108 in the upper plate 106.

The bottom surface of the lower plate 104 can include a plurality of downwardly extending, annular walls 116, each of which surrounds a set of apertures 112. The walls 116 and the portions of the lower plate 104 that are surrounded by the walls define a plurality of respective transfer cups for receiving portions of apple pieces from selected filling cups 44. Each wall 116 is sized and shaped to contact and form a substantially air-tight seal with the adjacent surface of the apportionment conveyor around each filling cup. This facilitates the formation of a vacuum in the filling cups 44 that causes the apple pieces to be drawn against the lower plate 104. Additionally, the lower surface of each filling cup 44 can be formed with a plurality of openings or apertures 118 (FIG. 5) or can be formed from an air-permeable material (e.g., a mesh screen or a cloth or cloth-like material) to allow air to be drawn upwardly into the filling cups below the apple pieces when a vacuum is applied to the head portion 50. Advantageously, the upward flow of air assists in lifting the apple pieces into respective transfer cups of the head portion 50.

While the head portion 50 in the illustrated embodiment includes ten transfer cups for receiving respective portions of apple pieces (as shown in FIG. 10), any number of transfer cups can be implemented in the head portion. Also, in another embodiment, multiple head portions having one or more transfer cups and mounted on respective robotic arms can be used. In the latter embodiment, each robotic arm can be independently controlled to pick up one or more portions of apple pieces at one transfer area in the apportionment conveyor or at multiple transfer areas in the apportionment conveyor.

One of the main advantages of the head portion is that it is capable of picking up, transferring, and depositing apple pieces without compromising the integrity of the preservative coating on the apple pieces, and hence prevents oxidation of the apple pieces.

Figure 13:
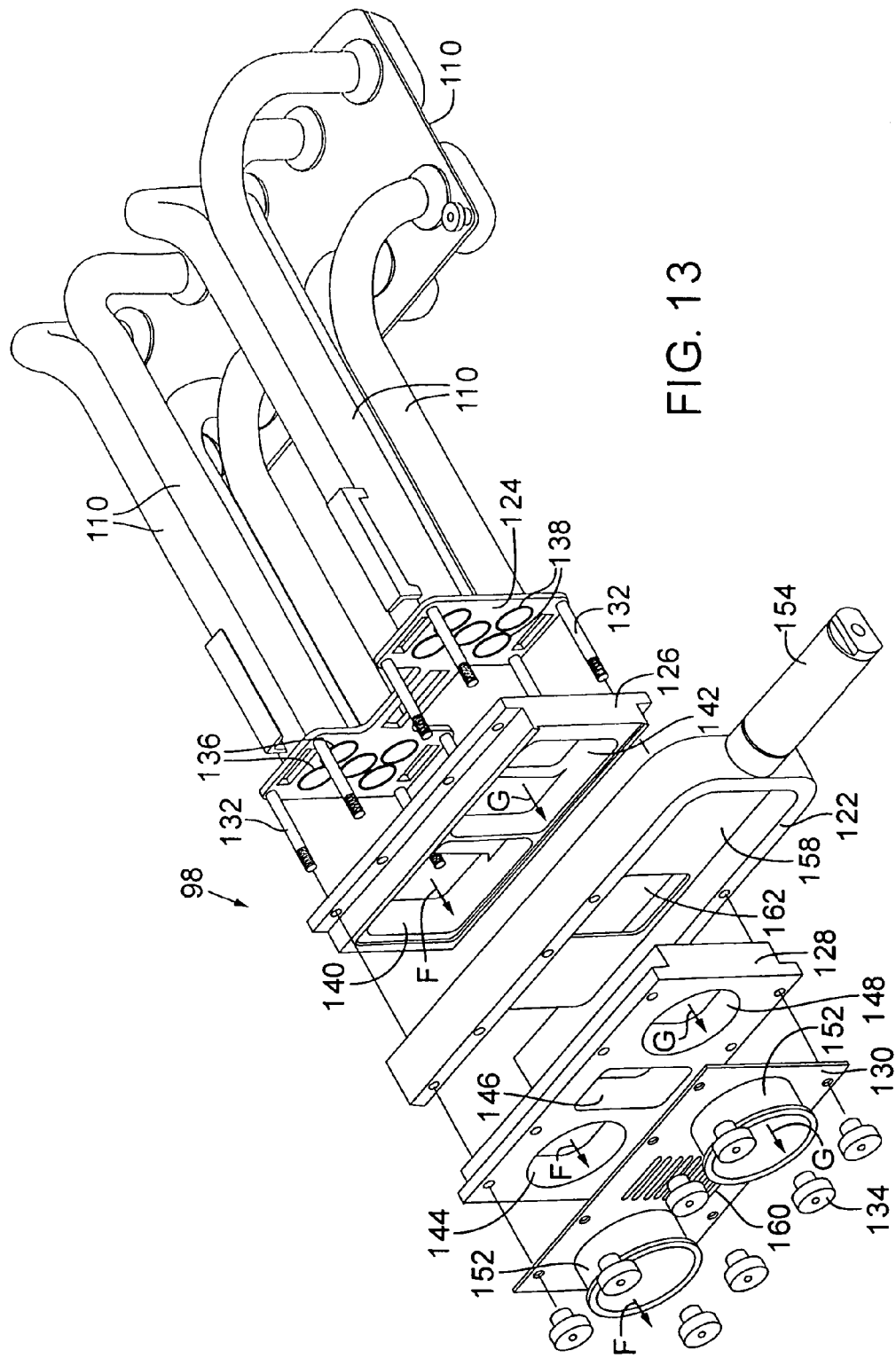
FIG. 13 is an exploded view illustrating the gate valve when it is in the open position.
Figure 14:
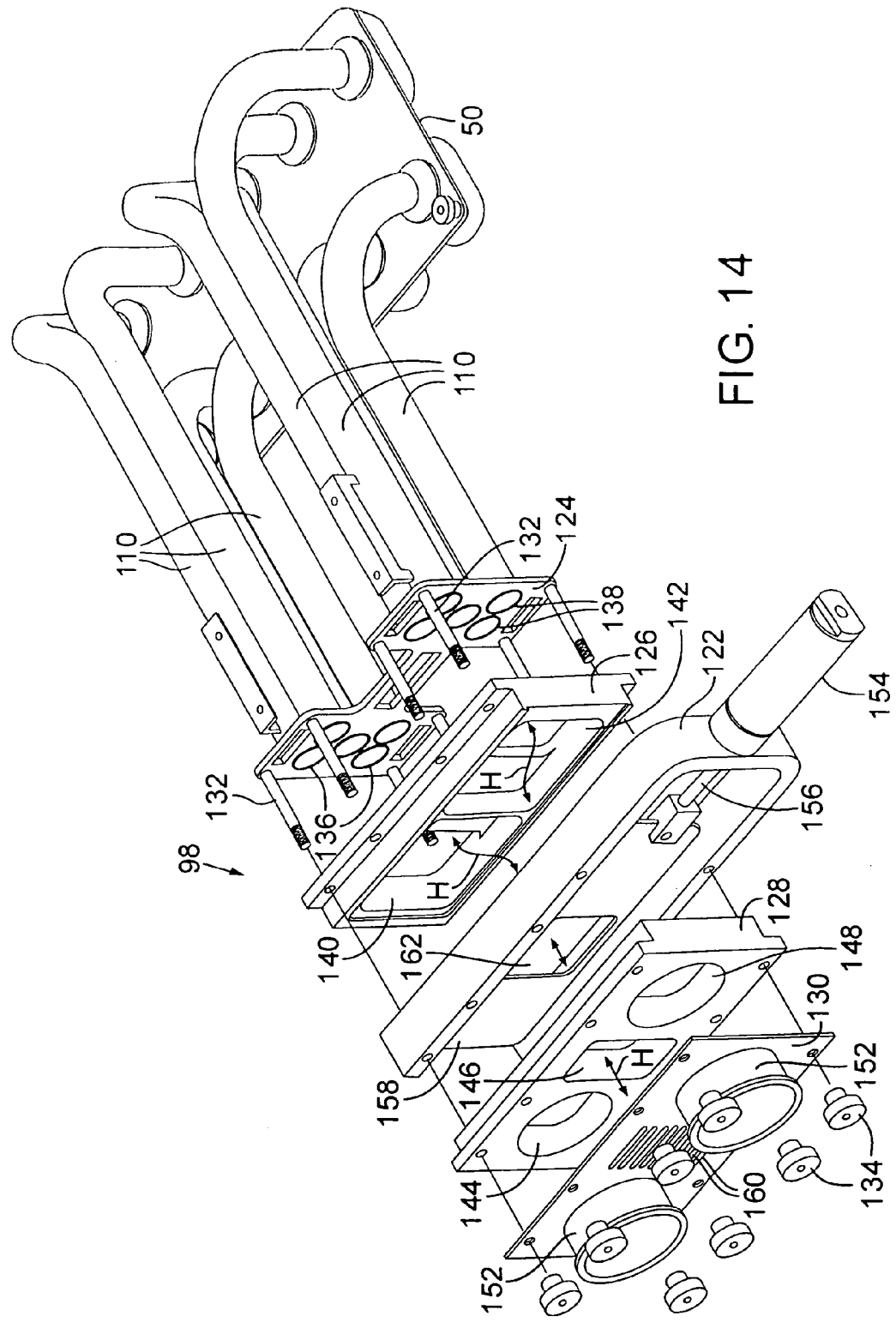
FIG. 14 is an exploded view illustrating the gate valve when it is in the closed position.

As noted above, the gate valve 98 controls the application of vacuum to the head portion 50. As shown in FIGS. 11-14, the illustrated gate valve 98 includes a generally U-shaped frame 122, a first manifold 124 (FIGS. 13 and 14), a first plate 126, a second plate 128, and a second manifold 130. The manifolds 124, 130 and the plates 126, 128 can be secured to the frame 122 via bolts 132 and clamping knobs 134. The bolts 132 extend from the first manifold 124 through corresponding openings in the plates 126, 128 and the second manifold 130 (as best shown in FIGS. 13 and 14). The clamping knobs 134 are tightened onto the threaded ends of the bolts 132 to secure the assembly together.

As shown in FIGS. 13 and 14, the first manifold 124 is formed with apertures 136 that are fluidly connected to a first opening 140 formed in the first plate 126 and apertures 138 that are fluidly connected to a second opening 142 formed in the first plate 126. Five of the conduits 110 open into apertures 136 and the other five conduits 110 open into apertures 138. The second plate 128 is formed with a first opening 144, a second opening 146, and a third opening 148. The first and third openings 144, 148 are in communication with respective openings 150 (FIG. 11) formed in the second manifold 130. The second manifold 130 can have ferrules 152 or other connectors at each opening 150 for connecting to vacuum conduits 96 (FIG. 9). The second opening 146 in the second plate 128 is in communication with vent openings 160 in the second manifold 130.

Mounted to the frame 122 is an actuator 154 (e.g., a pneumatic or electric actuator) that has a slidable piston 156 (FIG. 14) coupled to a sliding plate 158. The plate 158 is formed with a central opening 162. The actuator 154 is operable to slide the plate 158 between a first position for opening the gate valve (FIG. 13) and a second position for closing the gate valve (FIG. 14).

More specifically, when the gate valve is opened (as shown in FIG. 13), the opening 162 in plate 158 is aligned with the opening 142 in plate 126 and the opening 148 in plate 128. This allows the vacuum source to draw air through the apertures 112 (FIG. 10) in the head portion 50 into the vacuum conduits 110. Air exiting the conduits 110 that are connected to apertures 136 in the first manifold 124 flows through the opening 140, the opening 144, and the corresponding opening 150 in the second manifold 130 (as indicated by arrows F in FIG. 13). Air exiting the conduits 110 that are connected to apertures 138 in the first manifold 124 flows through the opening 142, the opening 162, the opening 148, and the corresponding opening 150 in the second manifold 130 (as indicated by arrows G in FIG. 13).

When the gate valve is closed (as shown in FIG. 14), the opening 162 in plate 158 aligns with the opening 146 in the plate 128 and the plate 158 blocks air from flowing between openings 140 and 144, and between openings 142 and 148. When the plate 158 is in this position, the vacuum source is fluidly disconnected from the head portion 50 and atmospheric air is allowed to flow through openings 160 in the second manifold 130, the opening 146 in the plate 128, the opening 162 in the plate 158, the openings 140, 142 in the plate 126, and into the conduits 110 (as indicated by arrows H in FIG. 14). Venting the head portion 50 to atmosphere facilitates the release of apple pieces from the lower surface 104 of the head portion 50.

In addition, the fluid conduits 96 (FIGS. 2 and 9) can be connected to a valve (not shown), which in turn is connected to the vacuum source via a main vacuum conduit (not shown). The valve can be operated to vent the main vacuum conduit to atmosphere when the gate valve 98 is closed so as to reduce the load on the vacuum source.

As shown in FIG. 9, a vibrating mechanism 120 can be mounted on the head portion to facilitate the release of apple pieces from the head portion 50. In a working embodiment, for example, the vibrating mechanism 120 comprises a model 55-1 pneumatic piston vibrator, available from Vibco, Inc. (Wyoming, R.I.), although various other types of vibrators also can be used. In use, the vibrating mechanism 120 is activated when the head portion 50 is positioned over the dough sheet D (FIG. 2) and the gate valve 98 is closed to remove the vacuum from the head portion 50. Vibration of the vibrating mechanism 120 causes vibration of the head portion 50, which is effective to facilitate the release of apple pieces onto the dough sheet and prevent apple pieces from sticking to the transfer cups.

In another embodiment, the transfer cups of the head portion 50 can be fluidly connectable to a source of a pressurized gas (e.g., compressed air). For example, a compressed air line can be connected to each conduit 110 with a respective valve. When the gate valve 98 is closed to remove the vacuum from the head portion 50, compressed air can be delivered to each transfer cup to facilitate the release of apple pieces from the head portion. This can be done in lieu of or in addition to activating the vibrating mechanism 120.

In particular embodiments, the dough sheet D is conveyed by the dough conveyor 16 (as indicated by arrow I in FIG. 2) as filling portions are deposited on the dough sheet. Additionally, when the head portion 50 is positioned over the dough sheet D for depositing filling portions, the robotic arm 92 desirably is operated to move the head portion 50 at the same speed and in the same direction as the dough sheet until all of the apple pieces are released from the head portion. The head portion travels synchronously with the dough sheet for a short interval after the vacuum is released (and the vibrator activated) to allow each pile of apple pieces to settle on the dough sheet. This ensures that each portion of apple pieces retains its same general shape when deposited on the dough sheet and lessens the possibility of apple pieces falling off the pile. In one implementation, an encoder (not shown) is mounted on the head roll of the dough conveyor. The robot controller tracks the speed of the dough conveyor via the encoder and controls the robotic arm to move the head portion at the same speed as the conveyor.

After portions of apple pieces are deposited on the dough sheet D, the dough conveyor 16 conveys the dough sheet to additional stations further processing. For example, additional ingredients, such as a cinnamon and sugar syrup, can be deposited on top of each filling portion. Finally, dough casings are formed around the portions of apple pieces and separated from each other to form a plurality of individual turnovers. Conventional methods and techniques can be used to form the dough casings around the apple pieces and separate them into individual turnovers.

In certain embodiments, for example, the dough sheet D is separated into a top and bottom sheet of dough for forming a dough casing around each portion of apple pieces. For example, as shown in FIG. 2, the dough sheet D is cut longitudinally, as indicated by line L, to form two sheets of equal width. In the illustrated example, portions of apple pieces are deposited on the right half of sheet D, which serves as the bottom sheet, while the left half of sheet D serves as the top sheet.

After portions of apple pieces are deposited on the bottom sheet, the top sheet is conveyed onto a conventional cross-over conveyor, which conveys the top sheet along a path that extends over the bottom sheet. The end of the cross-over conveyor is positioned to convey the top sheet into overlying relationship on the bottom sheet. The two sheets of dough with multiple filling portions therebetween are then fed through a crimping and cutting apparatus that crimps together the dough around each portion to form a dough casing and separates the dough to form multiple, individual turnovers. Excess dough around each turnover can be trimmed using conventional techniques or methods. The turnovers can be packaged and frozen for distribution using conventional techniques or methods.

Figure 15:
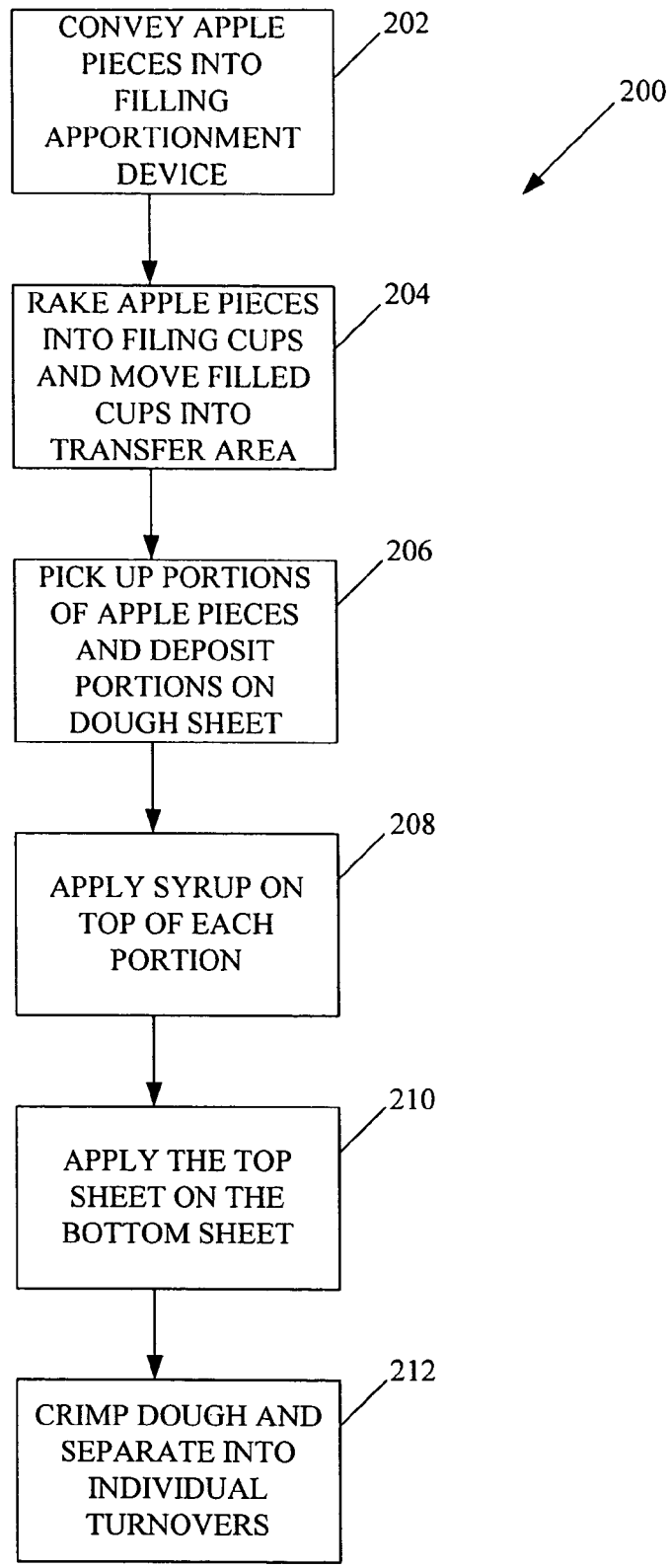
FIG. 15 is a flow chart illustrating a method for producing turnovers, according to one embodiment.

FIG. 15 is flow diagram showing a method 200 for producing apple turnovers (or other filled-dough products) using the system 10, according to one specific embodiment. At 202, apple pieces are conveyed by the in-feed conveyor 14 into the filling-apportionment device 12 and form a pile of apple pieces on the apportionment conveyor 28. An optical sensor detects the height of the pile on the apportionment conveyor 28 and communicates with a controller to automatically maintain the pile of apple pieces below a predetermined height (e.g., about 4-5 inches) by, for example, varying the speed of the in-feed conveyor or starting and stopping the in-feed conveyor.

At 204, the servomotor of the filling-apportionment device 12 moves the apportionment conveyor 28 a predetermined distance to cause a selected number of filling cups 44 to be filled with apple pieces as the cups move to the transfer area 48. As previously described, the rotating raking device 46 rakes the pile of apple pieces into the filling cups as the apportionment conveyor is advanced underneath the raking device.

A user can input into the controller the number of cups 44 that are to be filled with apple pieces and conveyed into the transfer area. As can be appreciated, this determines the number of individual portions that will be simultaneously picked up and transferred by the filling-transfer device 18. For example, the head portion 50 in the illustrated configuration is formed with a 2×5 array of transfer cups (FIG. 10). Hence, when using this embodiment, the user can program the controller to convey 2, 4, 6, 8, or 10 filling cups 44 filled with apple pieces into the transfer area 48.

At 206, the filling-transfer device 18 performs a transfer cycle, which includes picking up portions of apple pieces from the filling cups 44 in the transfer area 48 and depositing the picked-up portions on the dough sheet D. More specifically, this is accomplished by operating the robotic arm 92 to position the head portion 50 above the filling cups 44 in the transfer area. When the head portion is properly positioned, the gate valve 98 is opened to apply a vacuum to the head portion, which causes the apple pieces to be drawn against the lower surface of the head portion. After the apple pieces are picked up and the head portion is moved out of the transfer area 48, the servomotor moves the apportionment conveyor 28 to fill more filling cups 44 with apple pieces and move the filled cups into the transfer area.

While maintaining the vacuum on the head portion, the robotic arm 92 moves the head portion to a perch position that is about 4 to 5 inches above the sheet of dough being conveyed by the dough conveyor 16 and the robot controller determines a center location on the dough sheet to deposit the apple pieces. The robot controller then controls the robotic arm 92 to move the head portion 50 downwardly to a position about ¼ inch above the dough sheet, with the center of the head portion being aligned with the center location on the dough sheet. While moving the head portion 50 in the same direction and at the same speed of the dough sheet D, the gate valve 98 is closed and the vibrating mechanism 120 is activated to deposit the apple pieces onto the dough sheet D.

After the apple pieces are deposited on the dough sheet, the robotic arm 92 moves the head portion back into the transfer area 48 of the filling-apportionment device 12 to perform another transfer cycle. The batch of portions picked up in each transfer cycle is deposited on the dough sheet D adjacent the previously placed batch, as illustrated in FIG. 2.

In one embodiment, the dough conveyor 16 conveys a sheet of dough at a speed of about 18 ft/min. The sheet has a width of about 40" and thickness of about 3.5 mm.

In another implementation, the head portion 50 can be held at a stationary position when depositing apple pieces on the dough. In still another implementation, the dough conveyor can be temporarily stopped as apple pieces are deposited on the dough sheet. In yet another implementation, the dough sheet can be supported on a non-moving surface.

At 208, syrup (e.g., a cinnamon and sugar syrup) can be applied on top of each portion of apple pieces. If desired, other ingredients also can be added to each portion of apple pieces. At 210, the dough sheet D is separated longitudinally to form a bottom sheet and a top sheet, and the top sheet is conveyed onto the bottom sheet via a conventional cross-over conveyor. Prior to placing the top sheet on the bottom sheet, the top sheet can be fed through a cutting apparatus that cuts an "X" (or another letter, shape, or design) at each location in the top sheet that corresponds to the location of a portion of apple pieces on the bottom sheet. In this manner, when the top sheet is placed on the bottom sheet, an "X" is aligned over each portion of apple pieces. This provides the finished product with an appearance that resembles a homemade pie.

At 212, the two sheets of dough are fed through a stamping cutter, which crimps together the top and bottom sheet around each portion and separates the dough into individual turnovers in a single operation. Various other types of devices known in the art also can be used to crimp and/or separate the dough. Crimping is effective to form a dough casing with a seal that extends completely around the filling disposed between the upper and lower layers of dough. In other embodiments, however, the dough casing containing the filling can be formed with a seal that extends only partially around the filling. Thus, it is not required that the dough casing be formed to completely contain the filling.

If desired, additional ingredients can be applied to each turnover. For example, in one implementation, dry cinnamon and sugar is sprinkled on top of each turnover. Finally, the turnovers can be packaged and frozen using conventional techniques.

Notably, the embodiments disclosed herein can be used to make a turnover using fresh fruit pieces (which are uncooked), such as apples, having a relatively broad range of sizes and shapes, including relatively large pieces. The fresh pieces are coated with a sealant coating to prevent oxidation. The present apparatus handles the sealed pieces in a way that is sufficiently delicate as to avoid piercing the coating.

The present invention has been shown in the described embodiments for illustrative purposes only. The present invention may be subject to many modifications and changes without departing from the spirit or essential characteristics thereof. We therefore claim as our invention all such modifications as come within the spirit and scope of the following claims.

We claim:

1. An apparatus for making a food product having a dough casing and a filling, the apparatus comprising:
   a filling-apportionment mechanism configured to apportion a supply of filling pieces into one or more predetermined portions of filling pieces; and
   a filling-transfer mechanism comprising a pick-up device that is fluidly connectable to a vacuum source, the pick-up device being configured to pick up one or more portions of filling pieces when a vacuum from the vacuum source is applied to the pick-up device and the pick-up device is positioned proximate the portions of filling pieces to be picked up;
   wherein the pick-up device comprises an air-permeable pick-up surface that is sized and shaped to pick up and hold said one or more portions of filling pieces when the vacuum is applied to the pick-up device; and
   wherein:
   the filling-apportionment mechanism comprises a plurality of filling cups, each of which is sized and shaped to receive a respective portion of filling pieces; and
   the pick-up surface is permeable to air at locations that correspond to respective filling cups, such that when the pick-up surface is positioned over selected filling cups and the vacuum is applied to the pick-up device, the portions of filling pieces from the selected filling cups are picked up and held against the pick-up surface.

2. The apparatus of claim 1, wherein the pick-up device comprises an annular wall formed around each location on the pick-up surface that is permeable to air, each wall being configured to form a substantially fluid-tight seal around one of the selected filling cups.

3. The apparatus of claim 1, wherein each filling cup has an air-permeable bottom surface.

4. An apparatus for making a food product having a dough casing and a filling, the apparatus comprising:
   a filling-apportionment mechanism configured to apportion a supply of filling pieces into one or more predetermined portions of filling pieces; and
   a filling-transfer mechanism comprising a pick-up device that is fluidly connectable to a vacuum source, the pick-up device being configured to pick up one or more portions of filling pieces when a vacuum from the vacuum source is applied to the pick-up device and the pick-up device is positioned proximate the portions of filling pieces to be picked up;
   wherein the filling-apportionment mechanism comprises:
   an apportionment conveyor comprising a plurality of apportionment cups for receiving a respective portion of filling pieces, the conveyor being movable to move the apportionment cups in a first direction; and
   a rotatable raking device positioned above the apportionment cups;
   wherein movement of the apportionment conveyor in the first direction and rotation of the raking device cause a pile of filling pieces placed on the apportionment conveyor to be apportioned into the apportionment cups.

5. The apparatus of claim 4, further comprising an in-feed conveyor for conveying filling pieces onto the apportionment conveyor.

6. The apparatus of claim 4, wherein the filling pieces comprise apple pieces.

7. The apparatus of claim 4, wherein the filling-transfer mechanism comprises a vibrator, which when activated, vibrates the pick-up device to facilitate the release of filling pieces from the pick-up device.

8. The apparatus of claim 4, wherein the filling-transfer mechanism comprises a sliding gate valve that is movable between a first position to fluidly connect the vacuum source to the pick-up device and a second position to fluidly disconnect the vacuum source from the pick-up device.

9. An apparatus for making a food product having a dough casing and a filling, the apparatus comprising:
   an in-feed mechanism;
   an apportionment conveyor; and
   a raking mechanism extending in a direction that is generally perpendicular to the movement of the apportionment conveyor,
   wherein the in-feed mechanism is configured to deliver filling pieces onto a surface of the apportionment conveyor, the apportionment conveyor comprising a plurality of filling cups sized to receive a portion of filling pieces, the conveyor being movable to move the filling cups, and the raking mechanism is positioned above the cups and configured to rake a pile of filling pieces placed on the conveyor from the surface of the apportionment conveyor into the filling cups as the conveyor moves relative to the raking mechanism.

10. The apparatus of claim 9, wherein the raking mechanism comprises a plurality of angularly spaced, elongated rake arms that extend in a direction that is generally perpendicular to movement of the apportionment conveyor, the rake arms being rotatable about a common rotation axis relative to the conveyor for raking the filling pieces into the cups.

11. The apparatus of claim 10, wherein the raking mechanism supports the rake arms such that the rake arms remain in a generally perpendicular relationship relative to the conveyor as the rake arms rotate about the rotation axis.

12. The apparatus of claim 10, wherein each rake arm comprises a plurality of longitudinally spaced projections and a plurality of spaces defined between adjacent projections.

13. The apparatus of claim 12, wherein the projections of each rake arm are aligned with the spaces of an adjacent rake arm in the direction of movement of the conveyor.

14. The apparatus of claim 9, wherein the apportionment conveyor is a continuous, endless conveyor supported on spaced apart wheels, and the raking mechanism is supported inside the apportionment conveyor and between the wheels.

15. The apparatus of claim 9, further comprising:
an in-feed conveyor for conveying filling pieces onto the apportionment conveyor so as to form a pile of filling pieces on the apportionment conveyor; and
an optical sensor that is operable to detect the pile of filling pieces and control movement of the in-feed conveyor to prevent the pile of filling pieces from exceeding a predetermined height.

16. The apparatus of claim 9, further comprising a filling-transfer device configured to simultaneously pick up one or more portions of filling pieces from selected filling cups and transfer the picked up portions to a sheet of dough.

17. The apparatus of claim 16, wherein the filling-transfer device comprises a plurality of transfer cups that are fluidly connectable to a vacuum source, wherein each transfer cup has an air-permeable surface and can pick up a portion of filling pieces from a respective filling cup when a vacuum from the vacuum source is applied to the transfer cups and the transfer cups are positioned above the portions of filling pieces to be picked up.

18. The apparatus of claim 16, wherein the filling-transfer device comprises:
a robotic assembly configured to move in three-dimensional space; and
a head portion mounted on the robotic assembly and configured to simultaneously pick up one or more portions of filling pieces from selected filling cups and deposit the picked up portions on a sheet of dough;
wherein the robotic assembly is operable to move the head portion from a first location at the apportionment conveyor to a second location above the sheet of dough for depositing the portions of filling pieces thereon.

19. The apparatus of claim 18, wherein:
the apportionment conveyor is a continuous, endless loop of filling cups supported on spaced apart wheels; and
the head portion is sized for insertion inside the loop of filling cups for picking up one or more portions of filling pieces.

20. An apparatus for making a food product having a dough casing and a filling, the apparatus comprising:
a dough conveyor for conveying a sheet of dough;
a filling-apportionment mechanism configured to apportion a supply of filling pieces into one or more predetermined portions of filling pieces, the filling-apportionment device comprising an endless apportionment conveyor comprising a plurality of interconnected apportionment cups for receiving a respective portion of filling pieces, the conveyor being movable to move the apportionment cups in a first direction, the filling-apportionment mechanism comprising a rotatable raking device positioned above the apportionment cups, wherein movement of the apportionment conveyor in the first direction and rotation of the raking device cause a pile of filling pieces placed on the apportionment conveyor to be apportioned into the apportionment cups;
a filling-transfer mechanism comprising a pick-up device that is fluidly connectable to a vacuum source, the pick-up device comprising a plurality of transfer cups that are sized and shaped to mate with selected filling cups such that when the transfer cups are positioned over the selected filling cups and a vacuum from the vacuum source is applied to the transfer cups, the portions of filling pieces from the selected filling cups are picked up and held against inner surfaces of the transfer cups, the filling-transfer mechanism also comprising a robotic arm on which the pick-up device is mounted, the robotic arm being configured to move the pick-up device from a first location at the filling-apportionment mechanism for picking up portions of filling pieces from the selected filling cups and a second location for depositing the picked up portions of filling pieces on the sheet of dough;
a vibrator mounted on the pick-up device, the vibrator being operable to vibrate the pick-up device to facilitate the release of filling pieces from the pick-up device when the vacuum is removed therefrom; and
a sliding gate valve that controls the application of vacuum to the pick-up device, the gate valve being movable between a first position to fluidly connect the vacuum source to the pick-up device and a second position to fluidly disconnect the vacuum source from the pick-up device, wherein when the gate valve is in the second position, the transfer cups are vented to atmospheric.

* * * * *

UNITED STATES PATENT AND TRADEMARK OFFICE
CERTIFICATE OF CORRECTION

PATENT NO. : 7,628,106 B2
APPLICATION NO. : 10/927832
DATED : December 8, 2009
INVENTOR(S) : Pack et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1503 days.

Signed and Sealed this

Second Day of November, 2010

David J. Kappos
*Director of the United States Patent and Trademark Office*